US005152437A

United States Patent [19]

Klein et al.

[11] Patent Number: 5,152,437

[45] Date of Patent: Oct. 6, 1992

[54] DEVICE FOR CONNECTING APPARATUS WITHDRAWING ULTRAPURE LIQUIDS FROM CONTAINERS

[75] Inventors: Heinz-Dieter Klein, Hofheim am Taunus; Petra Meissner, Mainz; Norbert Ochs, Glashütten; Martin Schottler, Wiesbaden; Wolfgang Sievert, Wunstorf, all of Fed. Rep. of Germany

[73] Assignee: Hoechst Aktiengesellschaft, Frankfurt am Main, Fed. Rep. of Germany

[21] Appl. No.: 662,267

[22] Filed: Feb. 28, 1991

[30] Foreign Application Priority Data

Mar. 2, 1990 [DE] Fed. Rep. of Germany ....... 4006490

[51] Int. Cl.[5] ............ F16L 39/00

[52] U.S. Cl. ............ 222/400.7; 285/137.1

[58] Field of Search ............ 222/400.7, 400.8, 481; 137/212, 494, 588; 285/131, 137.1

[56] References Cited

U.S. PATENT DOCUMENTS

| | | | |
|---|---|---|---|
| 3,868,049 | 2/1975 | Johnston | 222/400.7 |
| 3,905,522 | 9/1975 | Johnston | 222/400.7 |
| 3,913,608 | 10/1975 | Johnston | 222/400.7 X |
| 4,089,444 | 5/1978 | Shea | 222/400.7 |
| 4,699,298 | 10/1987 | Grant et al. | 222/400.7 |

FOREIGN PATENT DOCUMENTS

| | | | |
|---|---|---|---|
| 103116 | 5/1899 | Fed. Rep. of Germany | 222/400.7 |
| 2450991 | 11/1980 | France | 222/400.7 |
| 275131 | 5/1951 | Switzerland | 222/400.8 |

*Primary Examiner*—Andres Kashnikow
*Assistant Examiner*—Anthoula Pomrening
*Attorney, Agent, or Firm*—Curtis, Morris & Safford

[57] ABSTRACT

In a device for connecting apparatus for withdrawing ultrapure liquids from containers, the connection plate 4 is provided with three bores 5, 6, 7, of which two bores 5, 6 each extend through a socket 8 for vertical pipes. The top plate 9 has an integrated valve body 23 for accommodating at least two valve heads 2, 3 and three bores 10, 11, 12, which are congruent with the bores 5, 6, 7 of the connection plate 4. The bore 12 extends through the valve body 23, and the two other bores 10, 11 terminate, at one end thereof, in pipe sockets 29, 30, which project into the bores 5, 6 of the connection plate 4, and, at the other end thereof, in channels 31, 32, 33, 34 for the ultrapure liquids, which are arranged in the valve body 23 and are interrupted by the valve heads 2, 3.

6 Claims, 3 Drawing Sheets

Fig. 3
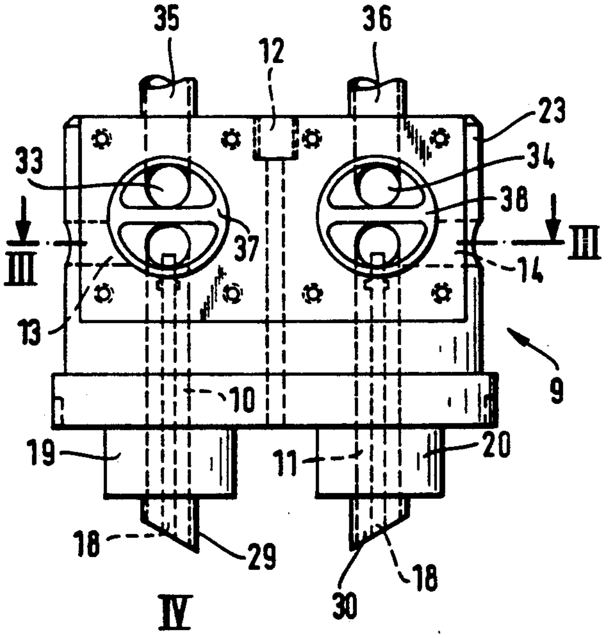
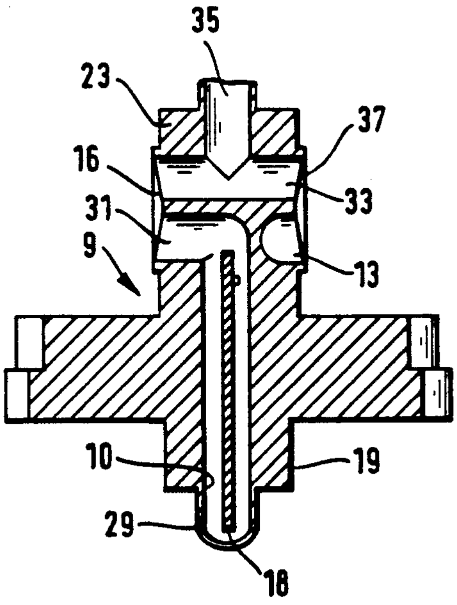
Fig. 5
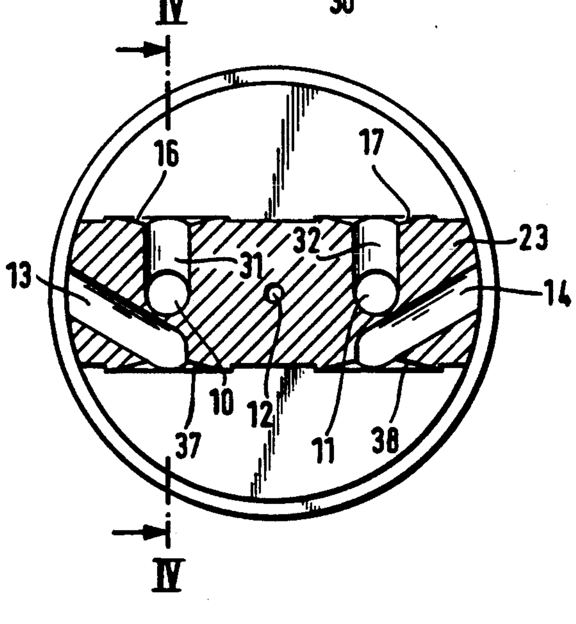
Fig. 4

DEVICE FOR CONNECTING APPARATUS WITHDRAWING ULTRAPURE LIQUIDS FROM CONTAINERS

BRIEF DESCRIPTION OF THE INVENTION

The invention relates to a device for connecting apparatus for withdrawing ultrapure liquids, in particular ultrapure liquid chemicals, from containers while largely avoiding particulate contamination.

BACKGROUND OF THE INVENTION

When withdrawing ultrapure liquids, such as organic solvents, acids and alkalis which are required inter alia for the production of pharmaceuticals, polymeric optical fibers, optical memories or highly-integrated semiconductor components, from transport containers, the quality of the ultrapure liquid may not be brought into question. This means that in addition to chemical contamination particulate contamination must also be largely excluded. It follows that in the withdrawing device parts sliding on one another, dead volumes and the supply of contaminated ventilation media are to be avoided.

SUMMARY OF THE INVENTION

The invention achieves the object by means of a device wherein the device consists of a) a connection plate having three bores, of which two bores each extend through a socket for vertical pipes, and b) a top plate having an integrated valve body for accommodating at least two valve heads, the top plate having three bores congruent with the three bores of the connection plate, of which one extends through the valve body and the two other bores terminate, at one end thereof, in pipe sockets, which project, into the bores of the connection plate, and, at another end thereof, in channels for the ultrapure liquids, which are arranged in the valve body and are interrupted by the valve heads.

One of the bores can be arranged centrally, and the two other bores can be arranged in mirror image fashion with respect to the central bore.

The valve body can be provided with two further channels, which are connected via two additional valve heads to the channel system for the ultrapure liquids. The connection plate can be constructed as a matrix for the top plate, and the two plates can have devices for connection to one another. Guiding devices such as pins or small tubes can be arranged in the bores of the top plate provided with pipe sockets.

The advantages of the invention are essentially to be seen in that upon removal of the top plate the small volumes of liquid remaining behind in the bores provided with pipe sockets necessarily and completely run back into the container. It is possible to rinse the withdrawing system without separating the top plate from the connection plate. The device has a low dead volume; the formation of particle accumulations in the lines conducting chemicals and in the bores is prevented. In conjunction with the use of diaphragm valve heads, the design of the valve body, which is integrated into the top plate, facilitates switching operations which generate only a few particles.

BRIEF DESCRIPTION OF THE DRAWINGS

The invention is explained in more detail below with reference to drawings which represent only one embodiment and in which FIG. 3 shows a view of the top plate, FIG. 4 shows the section III—III of FIG. 3, and FIG. 5 shows the section IV—IV of FIG. 4.

DETAILED DESCRIPTION OF THE PREFERRED EMBODIMENT

Figure 1:
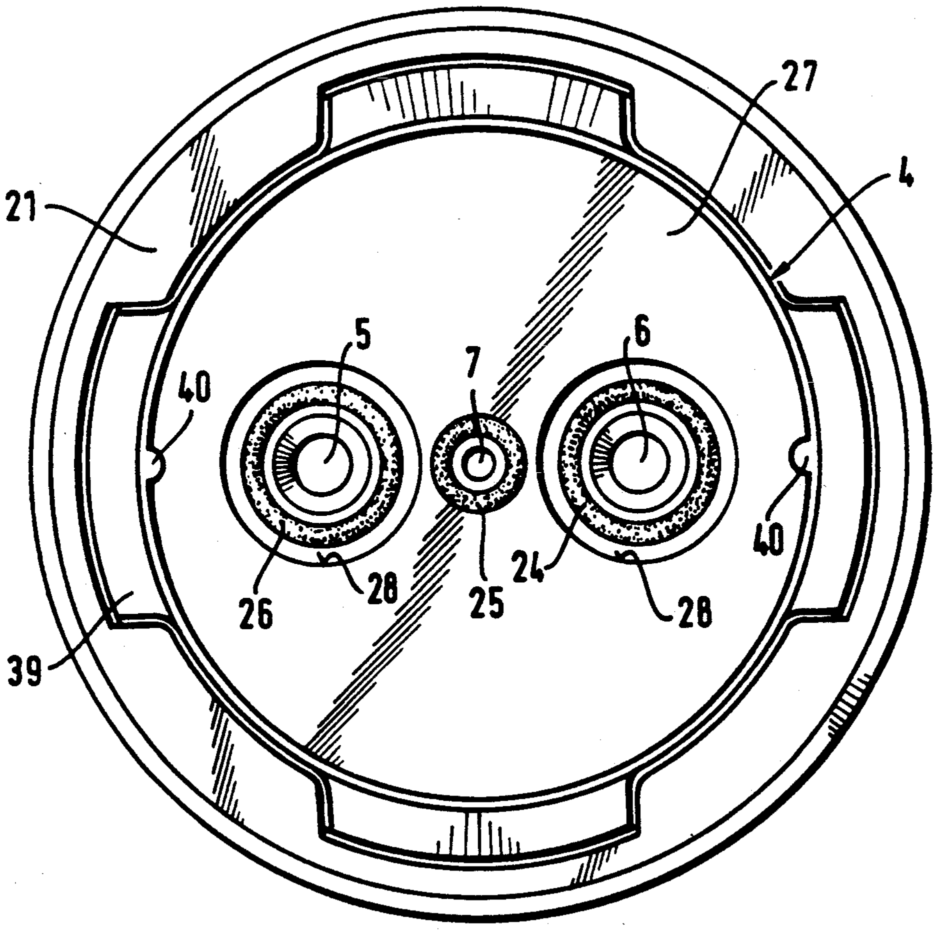
FIG. 1 shows a top view of the connection plate.
Figure 2:
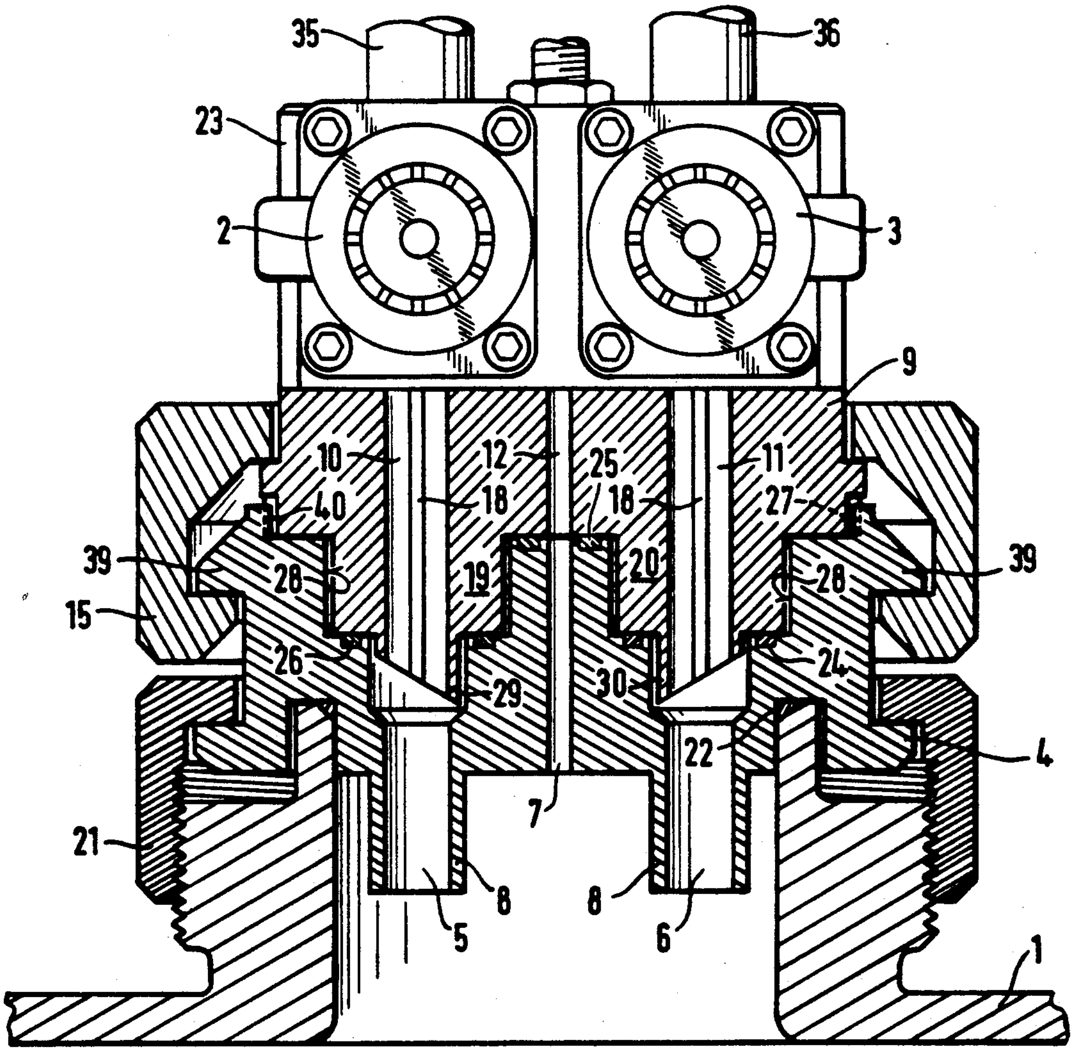
FIG. 2 shows the withdrawing device partly cut away.

The device for connecting a withdrawing apparatus for withdrawing ultrapure liquids from containers consists of a connection plate 4, which can be fastened to the filling and withdrawing opening 1 of a container by means of a cap nut 21 or the like. 22 indicates the seal between the connection plate 4 and opening 1. The connection plate 4 is provided with a continuous central bore 7, with respect to which there are arranged in mirror image fashion two bores 5, 6 which in each case extend through a socket 8 for the vertical pipes (not represented) projecting into the container. The connection plate 4 is constructed as a matrix for the top plate 9. It can have recesses 27, 28, which are arranged concentrically (27) around the central bore 7 or (28) around the bores 5,6, and which accommodate the top plate 9 with the cylindrical bolts 19, 20. The bores 5, 6 end in the recesses 28. The top plate 9 has an integrated valve body 23, which is provided with at least two valve seats 16, 17 for accommodating valve heads 2, 3. The top plate 9 has a central bore 12, which extends through the valve body 23 and together with the central bore 7 of the connection plate 4 forms the aeration and deaeration line for the container. Arranged in mirror image fashion with respect to the central bore 12 are two decentral bores 10, 11, which terminate, at one end thereof, in pipe sockets 29, 30, which project into the bores 5, 6 of the connection plate 4, and, at another end thereof, in channels 31, 32, 33, 34 for the ultrapure liquids, which are arranged in the valve body 23 and are interrupted by the valve heads 2, 3. The top plate can be sealed against the connection plate with seals 24, 25, 26. For the purpose of rinsing the withdrawing device, the valve body 23 can be provided with channels 13, 14 for supplying rinsing liquids, which terminate in two further valve seats 37, 38, and are connected via two valve heads (not represented) to the channels 33, 34. The channels 33, 34 are provided with line terminals 35, 36. The ends of the pipe sockets 29, 30 projecting into the bores 5, 6 can be bevelled, and this accelerates the drainage of the bores 10, 11 upon separation of the connection plate 4 and top plate 9. A further acceleration of the drainage is achieved by the arrangement of guiding devices 18, such as pins, for example. 15 indicates the screw ring for connecting the top plate and connection plate, 39 the cams of the connection plate 4 in which the screw ring 15 engages, and 40 the positioning cam for the top plate 9.

In order to guarantee that only containers with the same contents can be connected to the withdrawing device, and for the case that the connection plate 4 is to remain at the filling and withdrawing opening 1 of the container, the connection plate 4 can be provided with a coding (bores), which is correlated with corresponding means on the top plate 9 (not represented).

We claim:

1. A device for connecting an apparatus for withdrawing ultrapure liquids from containers, wherein the device consists of:

a) a connection plate having three bores, of which two bores each extend through a socket for vertical pipes, and b) a top plate having a valve body for accommodating at least two valve heads and a plurality of channels, said top plate having three bores congruent with the three bores of the connection plate, of which one bore of both the connection plate and the top plate is for ventilation extends through the valve body and the two other bores of the top plate are for withdrawing ultrapure liquids and, at one end thereof, extend into pipe supports, which project into the bores of the connection plate, and, at another end thereof, are each connected directly and separately to one of said valve heads of said top plate and each communicate with one of said channels for the ultrapure liquids, which are arranged in the valve body and are interrupted by the valve heads.

2. The device as claimed in claim 1, wherein the bore for ventilation of both the connection plate and the top plate is arranged in mirror image fashion with respect to the central bore.

3. The device as claimed in claim 1 wherein the valve body has two further channels, which are operatively connected to said channels for the ultrapure liquids.

4. The device as claimed in claim 1, wherein the connection plate is constructed as a matrix for the top plate, and the two plates have devices for connection to one another.

5. The device as claimed in claim 1, wherein guiding devices are arranged in the bores of the top plate which terminate in said pipe supports.

6. The device as claimed in claim 1, wherein diaphragm valve heads are used as the valve heads.

* * * * *